United States Patent Office 3,631,218
Patented Dec. 28, 1971

---

3,631,218
DOUBLE BOND ISOMERIZATION OF OLEFINS
Melvin K. Carter, Moraga, Peter W. Glockner, Alameda, and John L. Van Winkle, San Lorenzo, Calif., assignors to Shell Oil Company, New York, N.Y.
No Drawing. Filed Apr. 30, 1970, Ser. No. 33,502
Int. Cl. C07c 5/22
U.S. Cl. 260—683.2       10 Claims

ABSTRACT OF THE DISCLOSURE

Double bond isomerization of olefins is effected with a nickel chelate of a bidentate chelating ligand having a tertiary organophosphorus moiety and a carboxymethyl or carboxyethyl group attached directly to the phosphorus atom of the organophosphorus moiety.

BACKGROUND OF THE INVENTION

Olefins, under the influence of a variety of acidic and basic reagents, undergo isomerization involving a shift in the position of a carbon-carbon double bond. With a variety of acidic catalysts, particularly under vigorous conditions or with structures particularly prone to the Wagner-Meerwein rearrangement, carbon skeletal isomerization often occurs.

SUMMARY OF THE INVENTION

It has now been found that an improved process of isomerizing olefins is obtained through the use of a nickel chelate of a chelating ligand having a tertiary organophosphorus moiety and a carboxymethyl or carboxyethyl functional group attached directly to the phosphorus atom of the organophosphorus moiety as catalyst. The nickel chelate catalyst is characterized by promoting carbon-carbon double bond isomerization without any substantial carbon skeletal isomerization. By way of illustration, 1-butene is isomerized to a mixture of cis- and trans-2-butene in the presence of a nickel chelate of diphenylcarboxymethylphosphine.

DESCRIPTION OF PREFERRED EMBODIMENTS

The olefin reactant

The isomerization process is broadly applicable to hydrocarbon olefins of 4 or more carbon atoms having at least one ethylenic linkage, each carbon atom of which has a hydrogen. The olefinic reactant is acyclic, monocyclic or polycyclic of up to four rings, preferably of two rings, and is a monoolefin or is an olefinic reactant of up to three carbon-carbon double bonds, preferably of up to two, which comprise the only unsaturation within the molecule. Illustrative suitable olefins are 2-pentene, 2-methylpentene-1, 1,6-heptadiene, methylenecyclohexane, vinylcyclohexene, 4-propenylcyclohexane, 1,5-cyclooctadiene and bicyclo(3.3.0)octene. Preferred olefins are straight-chain hydrocarbon monoolefins (n-alkenes) of from 4 to 40 carbon atoms as illustrated by 1-butene, 1-hexene, 1-octene, 3-octene, 1-eicosene, 4-tricosene, 1-triacontene and 2-tetracontene. In general, terminal olefins, i.e., alpha-olefins, are preferred over analogous internal olefins and particularly preferred are the straight-chain or normal alpha-olefins of from 4 to 40 carbon atoms, i.e., 1-decene, 1-eicosene and 1-dotriacontene. Also suitably employed are mixtures of two or more of the above olefins, e.g., a mixture of alpha-olefins of from 4 to 40 carbon atoms formed by oligomerizing ethylene with Ziegler-type catalysts.

The catalyst

Generically, the catalyst as provided to the reaction mixture comprises an atom of nickel complexed or chemically bonded to a phosphorus-containing chelating ligand and sufficient organic complexing ligands to satisfy the coordination number of the nickel atom, which coordination number is preferably four. The phosphorus-containing ligand is a tertiary organophosphorus compound having a carboxymethyl, i.e., —CH$_2$COOH, or carboxyethyl, i.e., —CH$_2$CH$_2$COOH, group attached directly to the phosphorus atom and generally has from 4 to 100 carbon atoms but preferably from 4 to 60 carbon atoms. A suitable class of tertiary organophosphorus chelating ligands is represented by the Formula I:

wherein X is a carboxymethyl or carboxyethyl, R is a monovalent organo group, $x$ and $y$ are zero, one or two and sum of $x$ and $y$ is two, with the proviso that when $x$ is two the R groups may together with the phosphorus atom form a mono- or bicyclic heterocyclic phosphine having from 5 to 7 carbon atoms in each ring thereof.

The R group is an organo group of from 1 to 20 carbon atoms, preferably of from 1 to 10 carbon atoms, and is preferably free from acetylenic unsaturation. R is therefore suitably saturated aliphatic, i.e., acyclic saturated aliphatic as well as saturated cycloaliphatic; alkenyl, i.e., acyclic alkenyl as well as cycloalkenyl; or is aromatic, preferably mononuclear aromatic, and is a hydrocarbyl group containing only atoms of carbon and hydrogen or is substituted-hydrocarbyl group containing in addition to atoms of carbon and hydrogen other atoms such as oxygen, sulfur, nitrogen and halogen, particularly halogen of atomic number of from 9 to 53 inclusive, i.e., fluorine, chlorine, bromine, or iodine, which additional atoms are present in functional groups such as alkoxy, aryloxy, carboalkoxy, alkanoyloxy, halo, trihalomethyl, cyano, sulfonylalkyl, and like groups having no active hydrogen atoms. The R groups are preferably hydrocarbyl containing only the atoms of hydrogen and carbon. Whenever the R groups contain functional groups, it is preferred that any carbon atoms attached directly to the phosphorus atom be free of functional groups, i.e., any functional groups are not substituted on a carbon atom attached directly to the phosphorus atom.

Illustrative of suitable R groups are hydrocarbon alkyl R groups such as methyl, ethyl, propyl, isobutyl, lauryl, stearyl, cyclohexyl, and cyclopentyl; hydrocarbon alkenyl R groups such as butenyl, hexenyl, cyclohexenyl, alkyl or alkenyl groups having aromatic substituents such as benzyl, phenylcyclohexyl and phenylbutenyl; and substituted-hydrocarbyl R groups such as 4-bromohexyl, 4-carbethoxybutyl, 3-cyanopropyl, 4-chlorocyclohexyl and 4-acetoxybutyl. Aromatic R groups are exemplified by hydrocarbyl aromatic groups such as phenyl, tolyl, xylyl, p-ethylphenyl, and substituted-hydrocarbyl aromatic groups such as p-methoxyphenyl, m-chlorophenyl, m-trifluoromethylphenyl, p-propoxyphenyl, p-cyanophenyl, o-acetoxyphenyl and m-methylsulfonylphenyl.

Illustrative ligands of Formula I wherein $x$ is two (i.e., ligands of the formula R$_2$—P—X) are tertiary organophosphines such as dibutyl(carboxymethyl)phosphine, diphenyl(carboxymethyl)phosphine, di-p-chlorophenyl(carboxymethyl)phosphine, dimethyl(2 - carboxyethyl(phosphine, di - p - cyanophenyl(2-carboxyethyl)phosphine, methyl(phenyl)(2-carboxyethyl)phosphine.

Illustrative ligands of Formula I wherein $y$ is two [i.e., ligands of the formula X—P—(OR)$_2$] are organophosphonous acid esters such as O,O-dipropyl carboxymethylphosphonous acid esters, O,O-diphenyl carboxymethylphosphonous acid ester, O,O-dimethyl 2-carboxyethylphosphonous acid ester, and O,O-di-p-acetoxyphenyl 2-carboxyethylphosphonous acid ester.

Illustrative ligands of Formula I wherein $x$ is one and $y$ is one, i.e., ligands of the formula

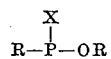

are organophosphinous acid esters such as O-ethylphenyl(carboxymethyl)phosphinous acid ester, O-phenyl phenyl(carboxymethyl)phosphinous acid ester, O-cyclohexyl cyclohexyl(2 - carboxyethyl)phospinous acid ester, O-benzyl benzyl(carboxymethyl)phosphinous acid ester and O - p - acetoxyphenyl butyl(carboxymethyl)phosphinous acid ester.

Illustrative cyclic phosphines of Formula I wherein $x$ is two and the R groups are joined to form heterocyclic rings are mono-cyclic tertiary phosphines such as 5-carboxymethyl - 5 - phosphacyclopentane, 6-(2-carboxyethyl)-6-phosphacyclohexane, 7-(carboxymethyl) - 7 - phosphacycloheptane; and bicyclic tertiary phosphines such as 8-carboxymethyl - 8 - phosphabicyclo(3.3.1)octane, 8-(2-carboxyethyl) - 8 - phosphabicyclo(3.2.1)octane, 8-(carboxymethyl) - 8 - phosphabicyclo(2.2.2)octane, 9-carboxymethyl - 9 - phosphabicyclo(4.2.1)nonane, 9-carboxymethyl - 9 - phosphabicyclo(3.3.1)nonane and 9-(2-carboxyethyl)-9-phosphabicyclo(4.2.1)nonane.

Organophosphine ligands of Formula I ($x$ is two) are preferred over the organophosphonous acid ester ligands of Formula I ($y$ is two) or the organophosphinous acid ester ligands of Formula I ($y$ is one, $x$ is one). Particularly preferred tertiary organophosphines are those wherein both R groups are hydrocarbyl and X is carboxymethyl.

In terms of the phosphorous-containing ligands of Formula I the nickel catalyst may be represented by the Formula II:

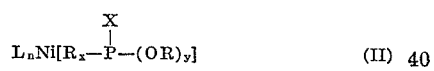

wherein R, X, $x$ and $y$ have the same significance as defined in Formula I, L is an organic complexing ligand and $n$ is one or two. It is to be understood that the nickel catalyst as depicted in Formula II represents only the empirical composition of the nickel catalyst and the precise nature of the bonding between the phosphorus-containing ligand and the nickel moiety is not definitely known. However, it is considered likely that the nickel is in a low valence state, e.g., zero-valent or mono-valent nickel.

The organic complexing ligand L is any ligand other than the required phosphorus-containing ligand which organic ligand is complexed to the nickel atom so as to satisfy the coordination number of the nickel atom. In general organic complexing ligands such as organophosphines, organoarsines, organostibines, organobismuthines, and the like non-ionic neutral organic ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. A particularly preferred class of olefinically unsaturated compounds are olefins of from 2 to 12 carbon atoms and represented by the Formula III:

wherein R' and R'' independently are hydrogen, alkyl, cycloalkyl, alkenyl, cycloalkenyl, aralkyl, aryl or alkaryl of up to 8 carbon atoms with the proviso that the R' and R'' groups may together form a divalent aliphatic moiety of from 2 to 10 carbon atoms and of up to three additional olefinic double bonds as the sole carbon-carbon unsaturation.

Illustrative olefins of Formula III therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclododecatriene.

Illustrative nickel chelates of Formula II are therefore diethylenediphenyl(carboxymethyl)phosphine - nickel, cyclooctadiene - dibutyl)2-carboxyethyl)phosphine - nickel, butadiene-di-p-chlorophenyl(2 - carboxyethyl)phosphine-nickel, cyclooctadiene-diphenyl(2 - carboxymethyl)phosphine-nickel, cyclooctatetraene - [9 - carboxymethyl-9-phosphabicyclo(3.3.1)nonane]nickel, bis - 2 - butene[9-(2 - carboxyethyl) - 9 - phosphabicyclo(4.2.1)nonane]-nickel.

The nickel chelate employed in the isomerization process is prepared by a variety of methods. In a preferred method, the nickel chelate is prepared by contacting an olefin-nickel compound and the bidentate phosphine ligand. One class of olefin-nickel compounds useful as catalyst precursors are zero-valent nickel compounds represented by the Formula IV.

wherein R'CH=CHR'' has the significance as defined in Formula III. Illustrative nickel compounds of Formula IV are therefore bis(cyclooctadiene)nickel(O), bis(cyclooctatetraene)nickel(O), and bis(1,3,7 - octatriene)nickel-(O).

Another class of olefin-nickel compounds useful as catalyst precursors is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula V:

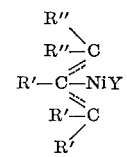

wherein R' and R'' independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R'' together with one R' may form a divalent alkylene moiety of 2 to 10 carbon atoms, preferably 2 to 5, and of up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula V are π-allylnickel chloride, π-allylnickel bromide, π-crotylnickel chloride, π-methylallylnickel chloride, π-ethylallylnickel iodide, π-cyclopentenylnickel bromide, π - cyclooctenylnickel chloride, π - cyclooctadienylnickel chloride- π-cinnamylnickel bromide, π-phenylallylnickel chloride, π-cyclohexenylnickel bromide- π-cyclododecenylnickel fluoride, and π-cyclododecatrienylnickel chloride. Although the complex of the above Formula V and other π-allyl nickel halides probably exist independently in the form of a dimer, for convenience and simplicity the π-allyl nickel halides are herein depicted and named as monomeric species.

Other suitable π-allyl nickel compounds of Formula V are π-allylnickel acetate, π-methylallylnickel propionate, π-cyclooctenylnickel octoate, π-allylnickel methoxyate and π-allylnickel ethoxyate.

Another suitable type of π-allyl nickel compounds useful as catalyst precursors is bis-π-allyl nickel compounds represented by the Formula VI:

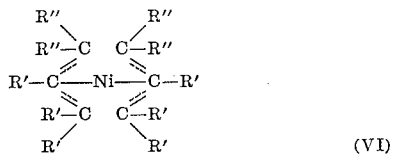

(VI)

wherein R", R' and the dotted line designation have the same significance as defined in Formula V, with the proviso that R" together with one R' of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VI are bis-π-allyl nickel, bis-π-methallyl nickel, bis-π-cinnamylnickel, bis-π-octadienylnickel, bis-π-cyclohexenylnickel, π-allyl-π-methallylnickel, and bis-π-cyclooctatrienylnickel.

The olefin-nickel catalyst component and the phosphorus-containing ligand component are generally contacted in substantially equimolar amounts, e.g., the molar ratio of olefin-nickel component to the ligand varies from about 2:1 to 1:2, but is preferably about 1:1. The nickel chelate is suitably preformed by contacting the catalyst precursors in a diluent, e.g., diluents employed for the isomerization process. In another modification, however, the catalyst precursor components are contacted in the presence of the olefinic reactant during the initiation of the isomerization process. By any modification, the catalyst precursor components are contacted at temperatures from about 25° C. to 100° C.

The nickel catalyst is suitably employed as an unsupported material. In certain modifications, however, it has been found desirable to employ the nickel catalyst supported on inorganic, solid catalyst carriers which are normally solid under reaction conditions and are heterogeneous, i.e., are substantially insoluble in the isomerization reaction medium. Illustrative of suitable inorganic, solid catalyst carriers are inorganic oxides such as alumina and inorganic materials known as siliceous refractory oxides. Suitable siliceous refractory oxides include synthetic components as well as acid treated clays and similar materials such as kieselguhr or crystalline macroreticular aluminosilicates known in the art as molecular sieves. In general, synthetic siliceous catalyst carriers are preferred over naturally occurring materials or molecular sieves, and exemplary synthetic siliceous refractory catalyst carriers include silica-alumina, silica-magnesia, silica-alumina-titania, silica-alumina-zirconia, silica-titanio-zirconia, silica-magnesia-alumina and the like.

When the nickel catalyst is supported, the ratio of catalyst composition to carrier is not critical. In general, amounts of nickel catalyst from about 0.01% to about 40% by weight based on the catalyst carrier, are satisfactory, with amounts from about 0.1% to about 20% by weight, calculated on the same basis, being preferred. The nickel catalyst is introduced onto the catalyst carrier in any suitable manner. In one modification, the supported catalyst composition is prepared by imtimately contacting the pre-formed catalyst and the carrier in an inert diluent, preferably the same inert diluent employed for preparing the nickel catalyst. In another modification, the supported catalyst can be prepared directly by contacting the nickel catalyst precursors in the presence of the catalyst carrier in a suitable inert diluent.

The amount of nickel catalyst employed in the isomerization process is not critical. In general, amounts of the nickel catalyst of from 0.001% to about 100% by weight based on olefinic reactant are satisfactory with amounts of from about 0.01% to about 25% by weight on the same basis being preferred.

The reaction conditions

The olefinic reactant is contacted with the catalyst or the catalyst precursor components in the liquid phase in the absence or presence of reaction solvent or diluent which is liquid at reaction temperature and pressure. Illustrative organic solvents are mononuclear aromatic compounds such as benzene, toluene and xylene; alkanes and alkenes, including cycloalkanes and cycloalkenes, of from 5 to 20 carbon atoms, such as butene-1, isopentane, pentene, cyclopentane, cyclohexane, cyclohexene, isohexane, heptane, isooctane, decane, decene-1, dodecene, hexadecene and eicosane; and halo-hydrocarbons such as chlorobenzene, bromobenzene, dichlorobenzene, hexafluorobenzene, carbon tetrachloride, ethylene dichloride, hexachloroethane, 1,4-dichlorobutane, and 1-chlorohexane. Illustrative oxygenated organic solvents are fully esterified polyacyl esters of polyhydroxy alkanes such as glycerol triacetate, tetraacyl esters of erythritol, diethylene glycol diacetate; monoesters such as ethyl acetate, butyl propionate and phenyl acetate; ketones such as acetone, methyl ethyl ketone and methyl isobutyl ketone; cycloalkyl ethers, e.g., dioxane, tetrahydrofuran, and tetrahydropyran; acyclic alkyl ethers, e.g., dimethoxyethane, diethylene glycol dimethyl ether and dibutyl ether; aromatic ethers such as anisole, 1,4-dimethoxybenzene and p-methoxytoluene; aliphatic alcohols such as methanol, trifluoroethanol, hexafluoroethanol, trifluoropropanol, sec-butanol, perfluorobutanol, octanol, dodecanol, cycloalkanols, e.g., cyclopentanol and cyclohexanol; polyhydric acyclic hydroxyalkanes such as ethylene glycol, propylene glycol, glycerol and trimethylene glycol; phenols, such as cresol, p-chlorophenol, m-bromophenol, 2,6-dimethylphenol, p-methoxyphenol, 2,4-dichlorophenol; and alkylene carbonates such as ethylene carbonate, propylene carbonate and butylene carbonate. Other suitable organic solvents are nitrogen-containing solvents such as nitriles, e.g., acetonitrile and propionitrile; amines, e.g., butylamine, dibutylamine, trihexylamine, N-methylpyrolidine, N-methylpiperidine, and aniline; N,N-dialkylamides, e.g., N,N-dimethylformamide and N,N-dimethylacetamide; sulfur-containing solvents such as sulfolane and dimethylsulfoxide; and phosphorus-containing solvents such as trialkylphosphate, e.g., trimethyl phosphate, triethylphosphate and tributylphosphate. Still other suitable solvents comprise water or water containing a portion of a polar organic co-solvent. Suitable mixtures of water and a polar organic co-solvent vary by volume; from about 40% co-solvent to 80% co-solvent and from about 20% water to 80% water. In many modifications of the isomerization process, a portion of the olefinic reactant and products suitably serves as the reaction diluent and no added diluent is employed. When diluent is utilized, however, amounts up to about 30 moles of diluent per mole of olefinic reactant are satisfactory. Due largely to increased isomerization rates, preferred reaction diluents are alcohols, particularly lower alkanols ($C_2$-$C_4$) and lower fluoro-alkanols.

The process is suitably conducted in an inert reaction environment so that the presence of reactive materials such as oxygen is desirably avoided. Reaction conditions are therefore substantially oxygen-free.

The isomerization process is typically conducted by mixing the olefin to be isomerized, the diluent, if any, and the catalyst in an autoclave or similar pressure vessel. The method of mixing is not material. One reaction component may be added to the others in increments, although it is equivalently useful to initially mix the entire amounts of reaction mixture components. The isomerization process is conducted at any convenient temperature and pressure. Suitable reaction temperatures vary from about 10° C. to 200° C., the optimum temperature depending in part upon the particular catalyst and the olefin to be isomerized. Best results are obtained when the reaction temperature is from about 50° C. to 125° C. Suitable reaction pressures are those which serve to maintain the reaction mixture substantially in the liquid phase. Reaction pressures from about 1 atmosphere to about 50 atmospheres in general are satisfactory although autogeneous pressure, that is, pressure generated by the reaction mixture when maintained at reaction temperature in a sealed reaction system is preferred.

At the conclusion of the reaction, the olefinic product mixture is separated by conventional methods such as fractional distillation, selective adsorption and the like.

EXAMPLE I

A mixture of 14 g. of 1-butene, 0.1 g. of bis-1,5-cyclooctadienenickel(O) and 0.09 g. of diphenylcarboxymethylphosphine in 20 ml. of toluene and 10 ml. of trifluoroethanol was contacted at 70° C. for 1 hour in a stirred autoclave. Gas liquid chromatographic analysis showed that the olefinic product mixture consisted of 20% 1-butene and 80% cis- and trans-2-butene.

EXAMPLE II

A mixture of 7 g. of 1-hexene, 0.1 g. of bis-1,5-cyclooctadienenickel(O) and 0.09 g. of diphenylcarboxymethylphosphine in 20 ml. toluene and 10 ml. of trifluoroethanol was contacted at 70° C. for 2 hours in a stirred autoclave. Gas liquid chromatographic analysis showed that the resulting olefinic product mixture consisted of 62% 1-hexene, 18% 2-hexene and 20% 3-hexene.

EXAMPLE III

A mixture of 16.7 g. of 1-vinylcyclohexene-4, 0.1 g. of bis-1,5-cyclooctadienenickel(O) and 0.09 g. of diphenylcarboxymethylphosphine in 20 ml. of toluene and 10 ml. of trifluoroethanol was contacted at 70° C. for 2 hours in a stirred autoclave. Gas liquid chromatographic analysis showed that the resulting olefinic product mixture consisted of 12% 1-vinylcyclohexene-4 and 88% of a mixture of three other double bond-position isomers.

EXAMPLE IV

An alpha-olefin mixture was prepared by contacting 1.4 millimoles of bis-1,5-cyclooctadienenickel(O), 1.4 millimoles of diphenylcarboxymethylphosphine, 30 ml. of toluene and 10 g. of ethylene in a stirred autoclave for 2½ hours at 40-50° C. Gas liquid chromatographic analysis showed that the oligomeric product mixture consisted of 92% mole $C_4$-$C_{20}$ alpha-olefins and 8% mole $C_{20}+$ olefins. After standing at about 25° C. for 48 hours, the $C_4$-$C_{20}$ alpha-olefin content of oligomeric products decreased to 45% mole with concomitant production of the complementary amount of corresponding internal olefin isomers, due to isomerization of the alpha-olefins to internal olefins.

EXAMPLE V

By a procedure similar to that of Example II, 1-eicosene is isomerized to a mixture of internal eicosenes with a catalyst prepared by contacting equimolar amounts of bis-π-crotylnickel and dimethyl 2-carboxyethylphosphonous acid ester.

We claim as our invention:

1. A process of isomerizing the double bond of a hydrocarbon acyclic monoolefin of from 4 to 40 carbon atoms by contacting the monoolefin in liquid phase reaction medium at a temperature of about 10° C. to 200° C. with a catalyst of a nickel complex of a chelating ligand represented by the formula

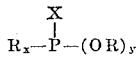

wherein X is a carboxymethyl or carboxyethyl, R is a monovalent hydrocarbyl group of 1 to 20 carbon atoms, $x$ is 0, 1 or 2 and the sum of $x+y$ is 2, with the proviso that when X is 2, the R groups may together with phosphorus atom form a mono or bicyclic heterocyclic phosphine having 5 to 7 carbon atoms in each ring thereof.

2. The process of claim 1 wherein the catalyst is provided as a nickel chelate represented by the formula

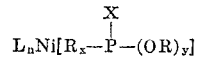

wherein R, X, $x$ and $y$ have the same significance as defined in claim 1, L is an olefinically unsaturated ligand and $n$ is 1 or 2.

3. The process of claim 2 wherein the nickel chelate is prepared by contacting in a diluent the ligand of the formula

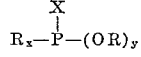

and an olefin-nickel compound of the formula

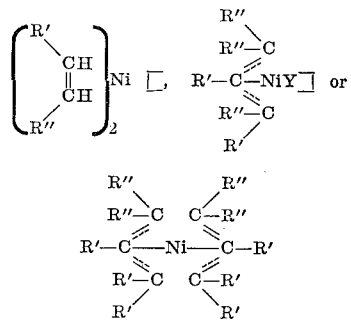

wherein R' and R" independently are hydrogen, alkyl, cycloalkyl, alkenyl or cycloalkenyl of up to 8 carbon atoms, with the proviso that one R" together with one R' may form a divalent alkylene moiety of from 2 to 10 carbon atoms and of up to three additional double bonds.

4. The process of claim 3 wherein $x$ is 2 and the monoolefin is a terminal monoolefin.

5. The process of claim 4 wherein X is carboxymethyl and the monoolefin is a normal terminal monoolefin.

6. The process of claim 5 wherein the chelating ligand is diphenylcarboxymethylphosphine and the reaction medium comprises a lower fluoro-alkanol.

7. The process of claim 6 wherein the olefin-nickel compound is bis-cyclooctadienenickel(O).

8. The process of claim 1 wherein the catalyst is supported on an inorganic oxide support selected from the group consisting of alumina and siliceous refractory oxides.

9. The process of claim 2 wherein the catalyst is supported on an inorganic oxide catalyst support, the amount of catalyst being from about 0.01% to about 50% by weight based on catalyst support.

10. The process of claim 4 wherein the catalyst is supported on an inorganic oxide catalyst support, the amount of catalyst being from about 0.1% to about 20% by weight based on the catalyst support.

References Cited

UNITED STATES PATENTS 3,420,904  1/1969  Hellwig _____ 260—666
3,375,287  3/1968  Tinsley et al. _____ 260—666 A DELBERT E. GANTZ, Primary Examiner V. O'KEEFE, Assistant Examiner U.S. Cl. X.R.

260—666 A